Dec. 10, 1957 F. O. HIGGINS 2,815,779
METHOD OF AND APPARATUS FOR STRETCHING AND STRESS RELIEVING LUMBER
Filed Feb. 24, 1956 4 Sheets-Sheet 1

Frank O. Higgins
INVENTOR.

BY
Attorneys

Dec. 10, 1957     F. O. HIGGINS     2,815,779
METHOD OF AND APPARATUS FOR STRETCHING AND STRESS RELIEVING LUMBER
Filed Feb. 24, 1956     4 Sheets-Sheet 2

Frank O. Higgins
INVENTOR.

Dec. 10, 1957
F. O. HIGGINS
2,815,779
METHOD OF AND APPARATUS FOR STRETCHING AND STRESS RELIEVING LUMBER
Filed Feb. 24, 1956
4 Sheets-Sheet 3
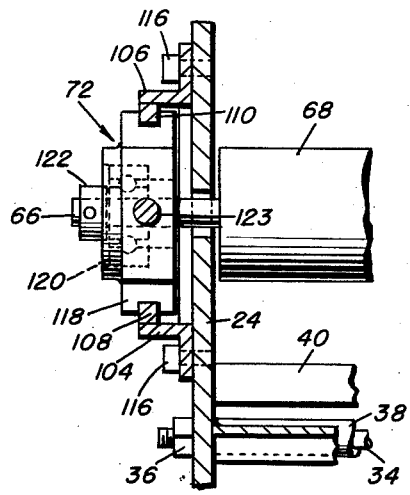
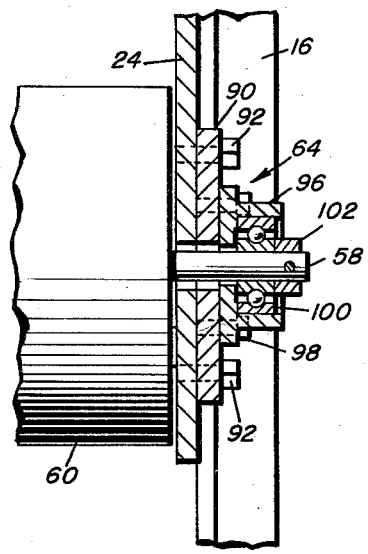
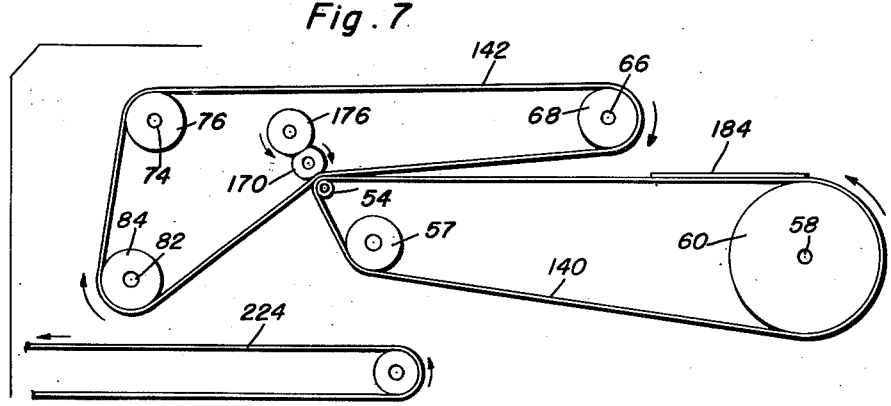
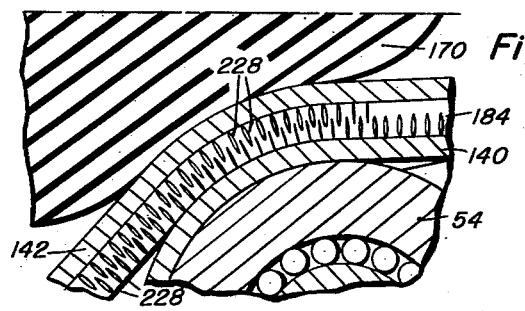
Frank O. Higgins
INVENTOR.
BY *Clarence A. O'Brien*
*and Harvey B. Jacobson*
Attorneys Dec. 10, 1957 F. O. HIGGINS 2,815,779
METHOD OF AND APPARATUS FOR STRETCHING AND STRESS RELIEVING LUMBER
Filed Feb. 24, 1956 4 Sheets-Sheet 4
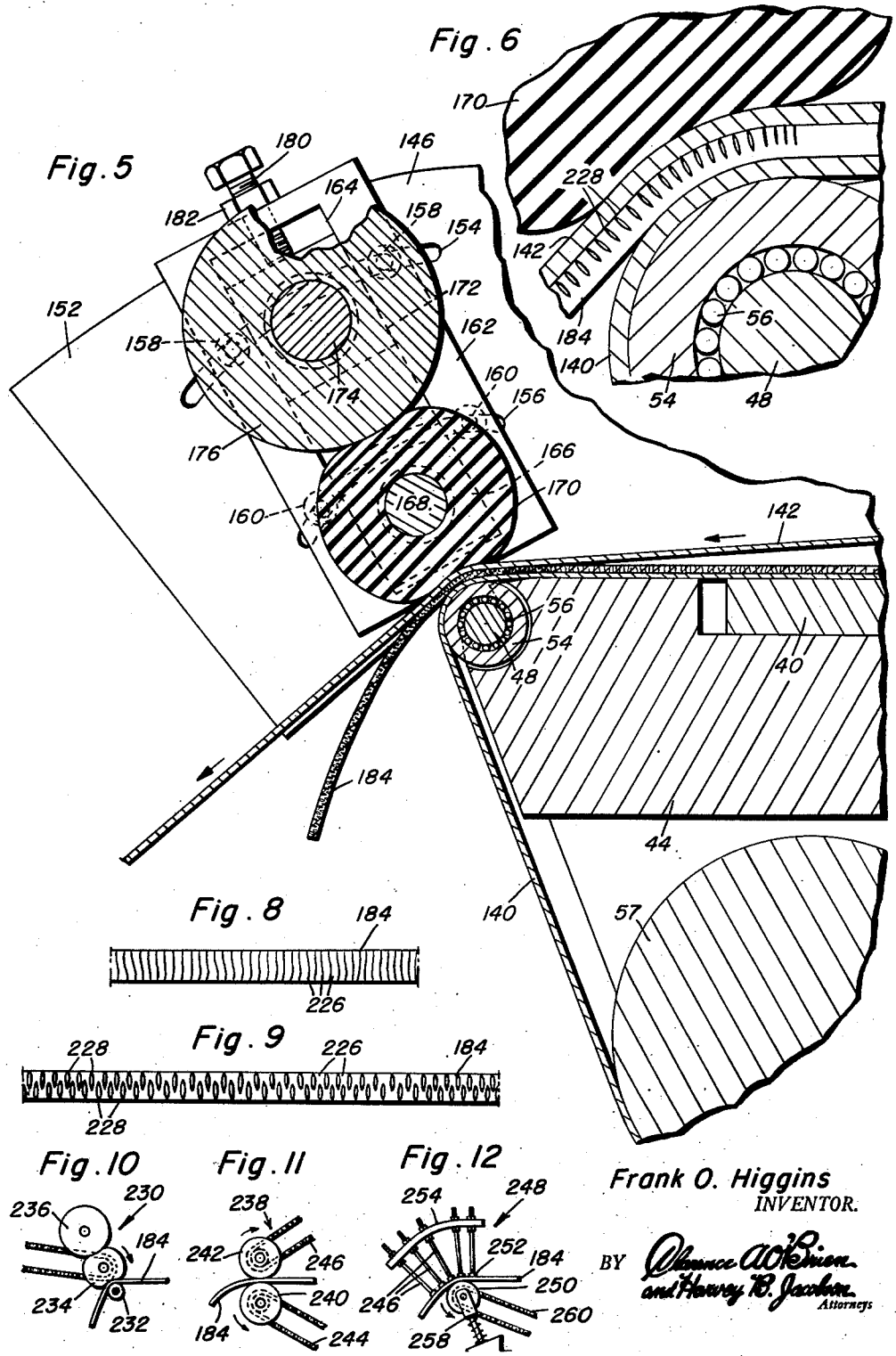
Frank O. Higgins
INVENTOR.

United States Patent Office 2,815,779
Patented Dec. 10, 1957

2,815,779

METHOD OF AND APPARATUS FOR STRETCHING AND STRESS RELIEVING LUMBER

Frank O. Higgins, New Orleans, La., assignor to Higgins Industries, Inc., a corporation of Louisiana Application February 24, 1956, Serial No. 567,516

6 Claims. (Cl. 144—309)

This invention relates in general to new and useful improvements in methods of treating lumber, and more specifically to an improved method of stretching and stress relieving lumber.

It is a well known property of wood to absorb liquids, such as water, and to swell or stretch upon the absorption of such water. While in certain instances this particular characteristic of wood may be desirable, in many instances, it is undesirable inasmuch as the swelling or stretching of the lumber upon the absorption of water results in the buckling of the lumber and the rendering of the finished wooden product either partially or totally useless. For example, in building construction lumber remains one of the primary materials. However, during rainy weather doors and windows swell to the extent that they will not function properly. Also, the majority of the homes utilize wooden flooring of various types. When such wooden flooring is accidentally exposed to moisture, they absorb such moisture and swell thereby causing a buckling of the floors. In view of this, houses which are built upon cementitious bases or over areas having a high water table must be provided with special flooring material. A primary example of such special flooring is that of the laminated flooring block. The flooring block must be laminated in order that any moisture which may be absorbed from the concrete base will be prevented from causing swelling or stretching of the flooring block due to the cross graining of the various laminations of the block. If it were not for the problem of absorbing moisture, the block could easily be of a single ply inasmuch as only a relatively small amount of the flooring block actually provides the finished surface and since no reinforcing for the upper ply or layer of the block is necessary inasmuch as the block is mounted on the concrete base.

It is therefore the primary object of this invention to provide an improved method of processing lumber, particularly wood veneer, whereby the veneer, after being treated, has a dimension normal to the line of the grain which is greater than the dimension which such veneer would assume when the veneer is completely saturated with water, whereby the veneer, when so treated, is placed in a confined area, it may absorb a maximum amount of water without stretching and thereby avoid the tendency to buckle.

Still another object of this invention is to provide an improved method of processing lumber, preferably veneer, wherein the individual fibers of the lumber are pulled apart to form expansion voids between the fibers in order that the individual fibers may have sufficient space into which to expand once they absorb moisture.

Still another object of this invention is to provide an improved method of processing lumber, such method including the steps of pulling apart the fibers of the lumber to form expansion voids between adjacent fibers, and the partial breaking of the connections between adjacent fibers whereby the lumber, in its stretched state, is stress relieved to avoid the tendency to resume its initial state.

Yet another object of this invention is to provide an improved method of processing lumber which includes the steps of soaking the lumber to be treated in a suitable liquid having an affinity for lumber, such liquid including water, whereby the individual fibers of the lumber swell or expand to a maximum thereby increasing the size of the lumber in a direction normal to the line of the grain of such lumber, and then further moving apart the fibers of the lumber whereby the lumber is stretched to a size greater than its water expanded size, and finally stress relieving the connections between adjacent fibers whereby the tendency for the lumber to return to its initial size is substantially eliminated.

A further object of this invention is to provide a new article of lumber which is in the form of a veneer having the individual fibers thereof pulled apart to stretch the strip and form expansion voids therebetween, and the connections between adjacent fibers are stress relieved whereby the tendency for the fibers to move together to their initial positions is substantially eliminated.

A still further object of this invention is to provide an improved machine for stretching lumber, the machine including means for progressively confining the lumber to be stretched and means for pulling apart the individual fibers of the lumber in a progressive movement while confined in order that the lumber may be stretched in a direction transverse to the line of the grain and provided with expansion voids intermediate the individual fibers.

Yet a further object of this invention is to provide an improved apparatus for stretching and stress relieving lumber, the machine including a roller of small radius, a follower for the roller mounted in cooperating relation with the roller and means for passing lumber or a veneer between the roller and follower or guide to permit the simultaneous progressive clamping and bending of the lumber or veneer whereby the individual fibers of the veneer are pulled apart to form expansion voids or spaces and the connections between adjacent fibers are partially broken so as to stress relieve such connections.

A still further object of this invention is to provide an apparatus for treating lumber, particularly veneers, such apparatus including means for feeding the veneer and progressively confining such veneer and bending it about a small radius whereby the individual fibers of the veneer are pulled apart and the connections therebetween are stress relieved.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged fragmentary transverse vertical sectional view taken substantially upon the plane indicated by the section line 3—3 of Figure 1 and shows the manner in which a shaft of one of the conveyor belt rollers is adjustably mounted;

Figure 4 is an enlarged fragmentary vertical sectional view taken substantially upon the plane indicated by the section line 4—4 of Figure 1 and shows the manner in which a shaft of another one of the conveyor belt rollers is adjustably mounted;

Figure 5 is an enlarged fragmentary vertical sectional view taken through the main working portion of the machine and shows the specific relationship between the components thereof which confine and bend a veneer, there being illustrated a veneer in the process of being confined and bent;

Figure 6 is an enlarged fragmentary sectional view taken through the veneer during the first step of stretching and showing the formation of voids therein;

Figure 7 is a schematic view showing the arrangement of the various rollers of the machine;

Figure 8 is a fragmentary enlarged transverse sectional view taken through the veneer prior to the treatment thereof by the machine, which is the subject of this invention;

Figure 9 is a schematic fragmentary transverse vertical sectional view of the veneer of Figure 8 and shows the same after it has been stretched and stress relieved in the machine, there being illustrated the existence of expansion voids or spaces between adjacent fibers of the veneer;

Figure 10 is a schematic view through the working components of a slightly modified form of machine for stretching and stress relieving lumber;

Figure 11 is a schematic view of the working mechanism of still another modified form of machine;

Figure 12 is a schematic view of a further modified form of machine for stretching and stress relieving lumber;

Figure 13 is a view similar to Figure 6 showing the formation of voids in the veneer during a second pass through the machine.

Figure 1:
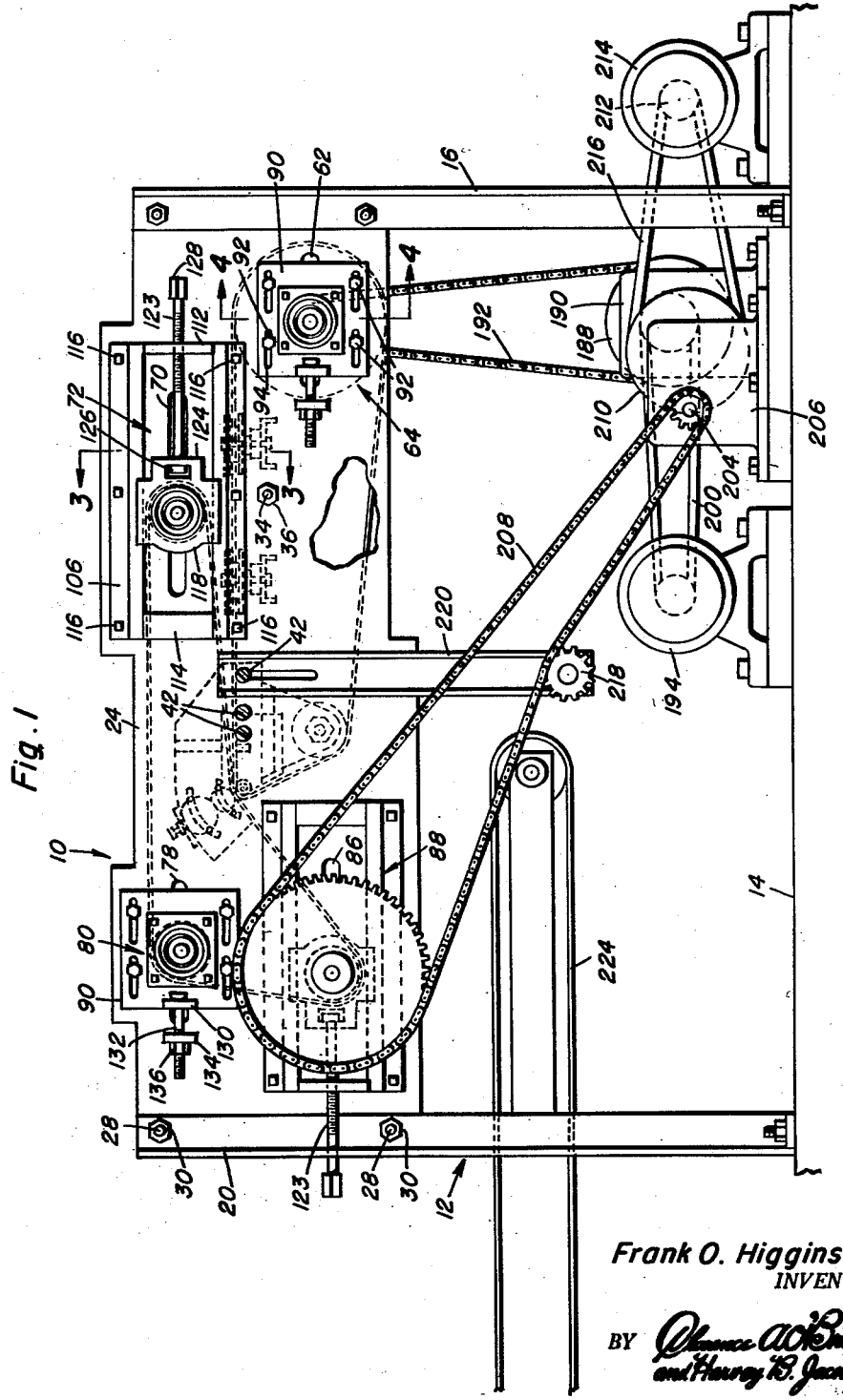
Figure 1 is a side elevational view of the machine for stretching and stress relieving lumber and shows the various relations of the fittings thereof, a portion of the frame of the machine being broken away in order to show the position of a conveyor belt thereof.

Referring now to the drawings in detail, it will be seen that there is illustrated in Figures 1 through 7, inclusive, the machine for stretching and stress relieving lumber, which machine is the subject of this invention and is referred to in general by the reference numeral 10. The machine 10 includes a frame which is referred to in general by the reference numeral 12. The frame 12 is mounted on a suitable base 14 and if desired, the base 14 may be incorporated as a lower part of the frame 12.

The frame 12 includes a pair of spaced front legs 16 and 18 and a pair of spaced rear legs 20 and 22. The legs 16 and 20 and the legs 18 and 22 are disposed in alignment and are connected together by side plates 24 and 26, the two side plates being identical.

The upper portions of the legs 16 and 18 and the legs 20 and 22 are connected together by tie bolts 28 which are provided at their ends with suitable nuts 30. The tie bolts 28 also pass through the side plates 24 and 26 and serve to secure them to the legs 16, 18, 20 and 22. Carried by the tie bolts 28 between the side plates 24 and 26 are sleeves 32 so as to space the side plates 24 and 26 and the various legs. The side plates 24 and 26 are also connected together intermediate their ends by a tie bolt 34 having nuts 36 on opposite ends thereof. A sleeve 38 is mounted on the tie bolt 34 to space apart the side plates 24 and 26.

Extending transversely between the side plates 24 and 26 is a horizontally disposed plate 40. The plate 40 is secured to the side plates 24 and 26 by suitable fasteners 42. In addition to the functions to be outlined hereinafter, the plate 40 also functions to connect and brace the side plates 24 and 26.

Secured to the rear edge of the plate 40 in any desired manner is a support bar 44 which is shorter than the plate 40 and is supported thereby. The support bar 44 is provided intermediate its ends with a plurality of closely spaced projecting supports 46 which support a transverse shaft 48 against flexing. The supports 46 underlie the shaft 48, as is best illustrated in Figure 5, and support the shaft in a direction of the load thereon.

Mounted on the central part of the shaft 48 and disposed intermediate the supports 46 are rollers 54. The rollers 54 are provided with suitable bearings 56 so that they freely revolve about the shaft 48. By supporting the shaft 48 intermediate each of the rollers 54, flexing of the shaft 48 and the resultant misalignment of the rollers 54 is prevented.

The ends of the support bar 44 are provided with depending ears which carry an idler roller 57. The roller 57 is disposed below and forwardly of the rollers 54.

Extending between the lower forward portions of the side plates 24 and 26 is a shaft 58 which carries a relatively large conveyor roller 60. Opposite ends of the shaft 58 pass through elongated slots 62 in the side plates 24 and 26 and are rotatably journalled in suitable bearing assemblies which are referred to in general by the reference numeral 64. The details of the bearing assemblies 64 will be set forth hereinafter.

Extending transversely between the side plates 24 and 26 adjacent the upper edge thereof and spaced rearwardly from the forward edges thereof is a shaft 66 which carries a conveyor roller 68. The ends of the shaft 66 pass through elongated openings 70 in the plates 24 and 26 and are mounted in adjustable bearing assemblies 72, the details of which will be set forth hereinafter.

Disposed in horizontal alignment with the shaft 66 is a shaft 74 carrying a roller 76 which is similar to the roller 68. The ends of the shaft 74 pass through an elongated horizontal slot 78 in the side plates 24 and 26 and are journalled in adjustable bearing assemblies which are referred to in general by the reference numeral 80. The bearing assemblies 64 and 80 are identical.

The machine 10 also includes a shaft 82 which carries a conveyor roller 84. The roller 84 is disposed below and slightly rearwardly of the roller 76. The shaft 82 extends through elongated slots 86 in the side plates 24 and 26 and has the ends thereof suitably journalled in adjustable bearing assemblies 88. The bearing assemblies 72 and 88 are identical.

Inasmuch as the bearing assemblies 64 and 80 are identical, only the bearing assembly 64 will be described in detail. The bearing assembly 64 includes a mounting plate 90 which is secured to the outer face of its respective side plate 24 or 26 by a plurality of fasteners 92. Each of the fasteners 92 is received in an elongated horizontal slot 94 in the mounting plate 90.

Carried by each of the mounting plates 90 is a bearing housing 96 which is secured in place by a plurality of fasteners 98. Mounted within the bearing housing 96 is a suitable bearing 100 which receives the outer end portion of its respective shaft, the bearing 100 of the bearing assembly 64 receiving the outer end portion of the shaft 58. The shaft 58 is retained against movement by a collar 102 which engages the bearing 100.

Referring now to Figures 1 and 3 in particular, it will be seen that the bearing assembly 72 includes a guideway formed by a pair of horizontally elongated angle members 104 and 106 which carry guide strips 108 and 110, respectively. The guide strips 108 and 110 are in opposed relation and disposed outwardly of the side plates 24 and 26. The ends of the angle members 104 and 106 are connected together at their forward ends by an outwardly projecting bar 112. The rear ends of the angle members 104 and 106 are connected together by a flat strap 114. The angle members 104 and 106 are secured to the side plates 24 and 26 by suitable fasteners 116.

Carried by the guide strips 108 and 110 is a slidable bearing housing 118 which carries a bearing 120. The outer end portion of each shaft 66 is received in the bearing 120 and rotation thereof with respect to the bearing housing 118 is permitted. The shaft 66 is retained against transverse movement by a collar 122.

Adjustment of the bearing housing 118 is facilitated by an elongated threaded member 123 which passes through and is threadedly engaged with the bar 112. The bearing housing 118 is provided with an offset portion 124 in which there is seated a collar 126. The collar 126 is rotatable with respect to the bearing housing 118 and is carried by the rear end of the threaded member 123. The threaded member 123 is provided with an end portion 128 to facilitate the rotation thereof.

It is pointed out at this point that the adjustable bearing assembly 88 being identical with the bearing assembly 72 need not be described in detail. However, the threaded member 123 of the bearing assembly 88 faces rearwardly as opposed to the forward facing of the threaded member 123 of the bearing assembly 72 and passes through suitable openings in the legs 20 and 22.

In order that adjustment of the mounting plate 90 of the bearing assemblies 64 and 80 may be obtained, there is carried by each bearing plate 90 a lug 130. Secured to each lug 130 is an adjusting bolt 132 which passes through an ear 134 secured to the respective one of the side plates 24 and 26. Threaded on the bolt 132 is a nut 136 which bears against the ear 134 to move the bearing assemblies 64 and 80 to belt tensioning positions.

Referring now to Figure 7 in particular, it will be seen that the upper surface of the conveyor roller 60 is disposed in generally horizontal alignment with the upper surface of the rollers 54. Entrained over the rollers 54, 57 and 50 is a conveyor belt 140 whose width is less than the width of the frame 12, as is best illustrated in Figure 2.

Entrained over the conveyor rollers 68, 76 and 84 is a second conveyor belt 142. The conveyor belt 142 is also entrained over the rollers 54, but engages the outer surface of the conveyor belt 140. Inasmuch as the rollers 54 are disposed below the roller 68, the conveyor belt 142 converges towards the conveyor belt 140 at its point of engagement with the rollers 54.

Figure 2:
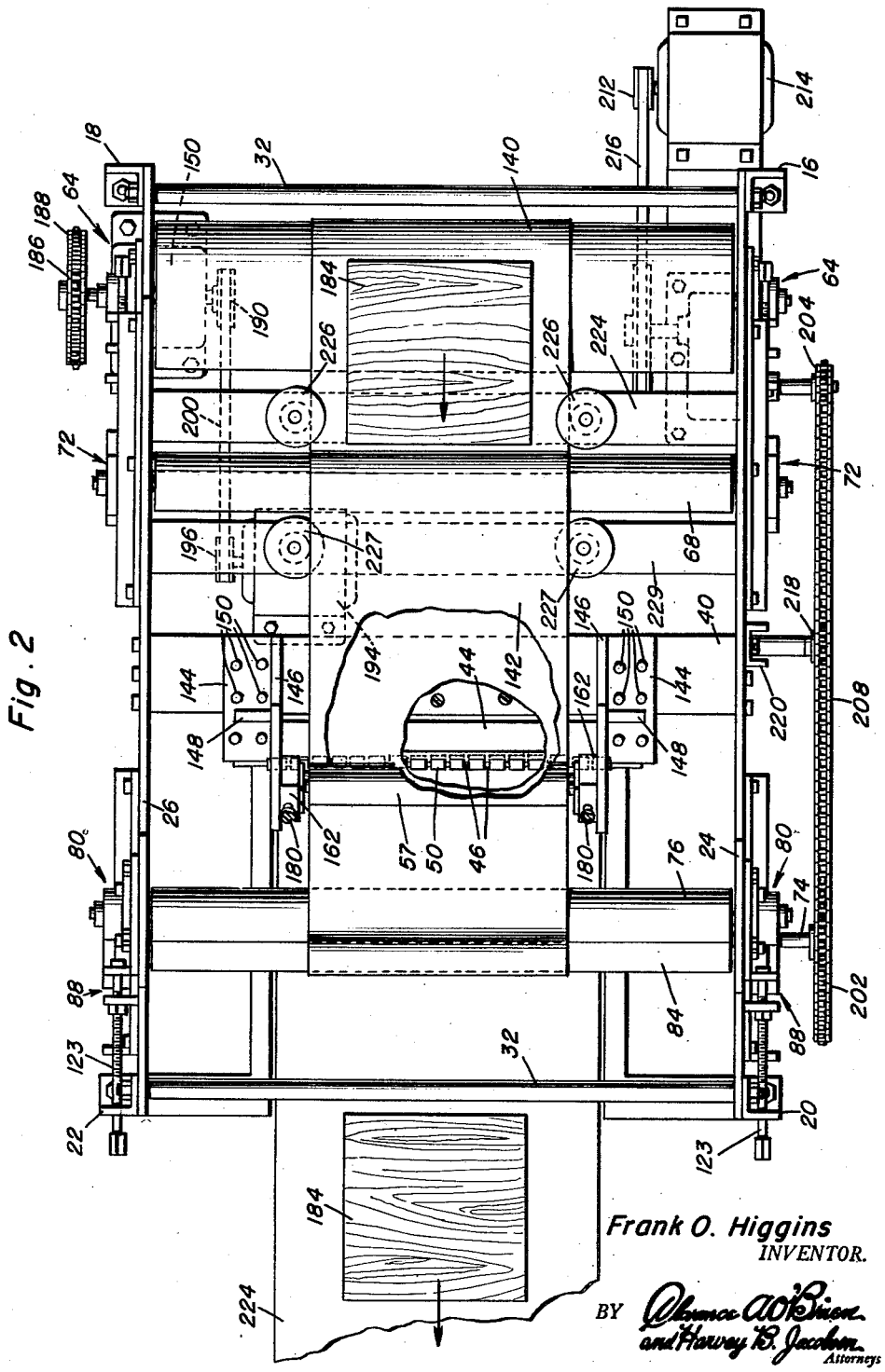
Figure 2 is a top plan view of the machine of Figure 1 and shows further the details thereof, a portion of the machine being broken away in order to illustrate the details of a roller thereof.

Referring now to Figures 1 and 2 in particular, it will be seen that carried by the plate 40 on opposite sides of the conveyor belt 140 and 142 is a pair of plates 144. Secured to the upper surfaces of the plates 144 along their inner edges are plates 146. The plates 146 are braced by suitable gussets 148. The plates 144 are secured to the plate 40 by suitable fasteners 150.

Referring now to Figure 5 in particular, it will be seen that the plates 146 are provided with downwardly curving rear portions 152. The rear portions 152 are provided with upper and lower arcuate slots 154 and 156 having the center of the shaft 48 as a common center. Adjustably received in the slots 154 and 156 are fasteners 158 and 160 which are threaded into plates 162 to adjustably secure the plates 162 to the plates 146 along the inner surfaces thereof, there being one plate 162 for each of the plates 146.

Each of the plates 162 is provided with an elongated guideway 164 having an axis passing through the center of the shaft 48. Mounted within the lower portion of each of the guideways 164 is a bearing block 166. Extending between the bearing blocks 166 and journalled therein for rotation is a shaft 168. The shaft 168 carries a rubber or similar material roller 170.

Mounted in the upper part of each guideway 164 is a bearing block 172. Extending between the bearing blocks 172 and through the journal therein is a transverse shaft 174. The shaft 174 carries a hard roller 176 which compressingly engages the upper portion of the roller 170. The pressure exerted on the roller 170 by the roller 176 is adjusted by selectively positioning the bearing blocks. This is accomplished by means of a set screw 180 passing downwardly into the upper part of each guideway 164 and engaging each bearing block 172. The set screw 180 is provided with a locking nut 182 to retain it in adjusted position.

As is best illustrated in Figure 5, when the veneer to be worked on by the machine 10 is placed into the machine 10, the veneer, which is referred to by the reference numeral 184, passes between the conveyor belts 140 and 142. The conveyor belt 140 passes over the rollers 54 and conforms to the configuration thereof. The conveyor belt 142 passes above the veneer 184 and is urged towards the rollers 54 by the roller 170. Inasmuch as the roller 170 is formed of compressible material, such as a medium hard rubber, it conforms to the general outline of the rollers 54. However, since the roller 170 is disposed further from the center of the shaft 48 in the outer surfaces of the rollers 54, the radius of curvature thereof is greater than the radius of curvature of the outer surface of the roller 54.

By varying the pressure exerted upon the roller 170, the area of pressure between the roller 170, the conveyor belt 142 and the conveyor belt 140 may be varied. Also, this area of pressure may be positioned as desired by swinging the plates 162 about the axis of the shaft 48 through the use of the slots 156 and 158. Further, the arc of pressure mentioned above may be varied by changing the material of the roller 170 or by increasing the diameter of the roller 170.

Inasmuch as the conveyor belts 140 and 142 are disposed at different distances from the center of the shaft 48, it is readily apparent that they must travel at a slightly different rate of speed in order that they may travel at the same angular rate relative to the shaft 48. To accomplish this, the conveyor belts 140 and 142 are separately driven.

The conveyor belt 140 is driven through the shaft 48. The shaft 58 projects through the bearing assembly 64 carried by the side wall 26 and is provided with a sprocket 186 which is aligned with a sprocket 188 of a reduction gear box 190. Connecting together the two sprockets 186 and 188 is a guide chain 192. The reduction gear box 190 is suitably mounted on the base 14 and is driven by an electric motor 194 which is also mounted on the base 14. The electric motor 194 carries a pulley 196 which is aligned with a pulley 198 of the reduction gear box 190. Entrained over the pulleys 196 and 198 is a drive belt 200.

The conveyor belt 142 is driven through the shaft 74. The shaft 74 is provided on the end thereof which passes through the side plate 24 with a sprocket 202. The sprocket 202 is aligned with a driven sprocket 204 carried by a reduction gear box 206. Entrained over the sprockets 202 and 204 is a drive chain 208. The reduction gear box 206 is provided with a pulley 210 which is aligned with a pulley 212 carried by an electric motor 214. Entrained over the pulleys 210 and 212 is a drive belt 216.

The reduction gear box 206 is of the adjustable type which permits the conveyor belt 142 to be driven at the desired rate with respect to the conveyor belt 140. This will allow the proper movement of the conveyor belts 140 and 142 between the rollers 54 and the roller 170.

When the angle of the arc through which the veneer 184 is varied, the conveyor roller 84 is shifted so as to retain the conveyor belt 142 in tangential relation with respect to the arc of bend for the veneer 184. In order to compensate for this, the chain 208 is provided with an idler sprocket 218. The idler sprocket 218 is carried by a depending arm 220 mounted on the side wall 24. The arm 220 is provided on the upper part thereof with an elongated slot 222 through which one of the fasteners 42 passes. By loosening the fasteners 42 and moving the arm in the desired direction, the chain 208 may be tensioned as desired.

In order to guide both the conveyor belt 140 and the veneer 184 in the vicinity of the rollers 54 and 170, there is carried by the frame 12 a transverse support bar 224. The support bar has adjustably mounted thereon at opposite edges of the conveyor belt 140 opposed guide pulley members 226. The belt 142 is similarly supported by a pair of guide pulley members 227 carried by a transverse support bar 229.

It is to be understood that the radius of the rollers 54 will vary dependent upon the thickness of the wooden material passed thereover and the type of material. Further, the angle of the arc through which the veneer 184 is bent will vary upon the thickness and material. However, this can be compensated for by making the various adjustments described above or by replacing the rollers 54.

In the operation of the machine 10, the veneer 184 is laid upon the conveyor belt 140 and passes in between the conveyor belt 140 and the conveyor belt 142. As it approaches the rollers 54 and 170, it becomes confined between the conveyor belts 140 and 142 and then is effectively gripped between the conveyor belts 140 and 142 by the pressure exerted thereon by the rollers 54 and 170. As the veneer 184 further passes between the rollers 54 and 170, it remains in confinement and is bent about a relatively small radius, the radius of that portion of the conveyor belt 140 passing over the rollers 54. As the veneer 184 is progressively bent in its confined state, individual fibers thereof are progressively pulled apart a slight amount in the manner best shown in Figure 6. In the pulling apart of the fibers, the connections between the fibers are at least partially broken so that when the veneer 184 has passed between the rollers 54 and 170 it is stress relieved and the individual fibers are retained in their spaced relation. The veneer 184 may be passed between the rollers 54 and 170 either in a dry state or in a wet state. However, it is preferred that the veneer 184 be saturated with water so that it has swelled or expanded to a maximum. The fibers of the veneer 184 are then pulled further apart and stress relieved so that the tendency of the fibers to resume their original position is substantially eliminated whereby a dried veneer 184, after treatment with the machine 10, has a dimension transverse to the axis of the grain which is greater than the similar dimension when completely saturated and expanded. It is to be understood that more than one pass of the veneer 184 may be required and if desired, there may be provided a plurality of machines 10. This can be accomplished by providing a suitable conveyor 225 for receiving the stretched veneer 184 and conveying it to another machine 10 (not shown).

Referring now to Figures 8 and 9 in particular, it will be seen that in the initial state the fibers of the veneer 184 are disposed relatively close together. However, after the veneer 184 has passed through the machine 10, the fibers thereof are pulled apart and permanently retained in this pulled apart relation so that the individual fibers 226 are spaced apart and there are provided expansion spaces or voids 228 between adjacent fibers 226. Each void 228 extends from the surface of the veneer 184 to a point beyond the neutral axis of the veneer 184. Inasmuch as the voids 228 extend from opposite surfaces of the veneer 184, the adjacent voids 228 are in overlapping relation. The voids 228 are slightly wider at their centers than at their ends and present only fine cracks in the surfaces of the veneer due to the confined relation of the surface of the veneer during the stretching operation. Thus, when the fibers 226 of the veneer 184 again become saturated with water, and the edges of such veneer 184 are confined, when the fibers 226 swell or expand due to the saturation thereof, they will expand into the expansion spaces or voids 228. Therefore, inasmuch as the stretched dimension of the veneer 184 is greater than the similar saturated dimension thereof, complete saturation of the veneer 184, after being treated by the machine 10 will not cause buckling thereof even though the edges thereof are confined. Accordingly, the veneer 184 may be utilized in flooring construction and may be relatively thin. Other advantages of the process performed by the machine 10 will be readily apparent in the manufacture of veneers and the like.

Referring now to Figure 10 in particular, it will be seen that there is illustrated a schematic view of a slightly modified form of machine which is referred to in general by the reference numeral 230. The machine 230 includes rollers 232 which will be identical with the rollers 54. Also included is a roller 234 which will be identical with the roller 170 and a roller 236 which will be identical with the roller 176. However, the roller 234 will be driven and the conveyor belt 140 and 142 may be eliminated. The veneer 184 may then be passed directly between the rollers 232 and 234. If desired, the rollers 232 may be driven in lieu of driving the roller 234.

Refering now to Figure 11, it will be seen that there is illustrated a modified form of machine which is referred to in general by the reference numeral 238. The machine 238 includes a pair of rollers 240 and 242 both of which are driven by drive chains 244 and 246. The roller 240 is relatively hard as compared to the roller 242. However, the roller 242 is driven at a greater speed than the roller 240 so that the fibers at the upper surface of the veneer 184 are pulled apart, as desired, and the veneer 184 bends about the roller 240.

Referring now to Figure 12 in particular, it will be seen that there is illustrated a further modified form of machine which is referred to in general by the reference numeral 248. The machine 248 includes a roller 250 which will replace the rollers 54. Associated with the roller 250 is an adjustable guide 252 which is carried by a suitable support 254 and support fingers 256. The guide 252 may be adjusted to conform to any radius of curvature and any desired part of curvature. The roller 250 is mounted by means of a spring support 258 and is driven by a drive chain 260. The operation of the machine 248 will be very similar to the machine 230.

It is to be understood that while the machines 230, 238 and 248 will to a certain degree cause the separation of the fibers 226 of the veneer 184, the machine 10 will produce a more even separation of the individual fibers 226 and a maximum stretching of the veneer 184 may be obtained with a minimum of expansion void or space thereby not damaging the appearance of the surface of the veneer 184.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A process of stretching veneers and the like and stress relieving the veneers while stretched to prevent shrinkage comprising the steps of supplying a liquid having an affinity for wood to the veneer to permit a maximum absorption of said liquid and the resultant stretching of said veneer in a direction normal to the fibers thereof, progressively confining opposite surfaces of the veneer along lines parallel to the fibers, and moving one of said surfaces in a direction normal to the fibers and at a greater rate than the other of said surfaces whereby the veneer is further stretched in the direction normal to the fibers and the connections between adjacent fibers at least partially broken whereby the tendency of the fibers as a whole to contract when dried is eliminated and the individual fibers contract to leave voids therebetween.

2. A process of stretching veneers and the like to increase the voids between individual fibers comprising the steps of first releasably engaging and pressure confining a veneer on opposite surfaces thereof and subsequently while pressure confined moving one of said surfaces in a direction normal to the fibers and at a greater rate than the other of said surfaces to tension and pull apart individual fibers of said veneer along said one surface and partially through the thickness of said veneer.

3. A process of stretching veneers and the like to increase the voids between individual fibers comprising the steps of first pressure confining a veneer on opposite surfaces thereof and subsequently while pressure confined moving one of said surfaces in a direction normal to the fibers and at a greater rate than the other of said surfaces to tension and pull apart individual fibers of said veneer along said one surface and partially through the thickness of said veneer, and repeating the foregoing step.

4. A process of stretching veneers and the like to increase the voids between individual fibers comprising the steps of first releasably engaging and pressure confining a veneer on opposite surfaces thereof and subsequently while pressure confined moving said veneer in a direction normal to the fibers and through a curved path to tensionally stress one of said surfaces and pull apart individual fibers of said veneer along said one surface and partially through the thickness of said veneer.

5. A process of stretching veneers and the like to increase the voids between individual fibers comprising the steps of first releasably engaging and pressure confining a veneer on opposite surfaces thereof and subsequently while pressure confined progressively bending said veneer about a small radius in a direction normal to the fibers and simultaneously tensionally stressing and pulling apart individual fibers of said veneer along said one surface and partially through the thickness of said veneer.

6. A process of stretching veneers and the like to increase the voids between individual fibers comprising the steps of first releasably engaging and pressure confining a veneer on opposite surfaces thereof and subsequently while pressure confined progressively bending said veneer about a small radius in a direction normal to the fibers and simultaneously tensionally stressing and pulling apart individual fibers of said veneer along said one surface and partially through the thickness of said veneer, and repeating the foregoing step.

References Cited in the file of this patent

UNITED STATES PATENTS

| | | |
|---|---|---|
| 172,501 | Robling | Jan. 18, 1876 |
| 390,442 | Brigham | Oct. 2, 1888 |
| 1,746,919 | White | Feb. 11, 1930 |
| 1,778,250 | Elmendorf | Oct. 14, 1930 |
| 1,778,251 | Elmendorf | Oct. 14, 1930 |
| 1,792,596 | Livingston | Feb. 17, 1931 |
| 1,809,681 | Elmendorf | June 9, 1931 |
| 1,819,775 | Elmendorf | Aug. 18, 1931 |
| 1,902,032 | Horine | Mar. 21, 1933 |
| 1,992,715 | Ovenhausen | Feb. 26, 1935 |
| 2,018,712 | Elmendorf | Oct. 29, 1935 |
| 2,336,535 | Elliott et al. | Dec. 14, 1943 |
| 2,414,808 | Hamill | Jan. 28, 1947 |
| 2,468,595 | Elmendorf | Apr. 26, 1949 |
| 2,505,302 | Ramsey | Apr. 25, 1950 |